United States Patent [19]

Morikawa

[11] Patent Number: 5,748,341
[45] Date of Patent: May 5, 1998

[54] METHOD OF AND APPARATUS FOR DETERMINING WHETHER AN ORIGINAL IS PRESENT IN A READOUT REGION

[75] Inventor: Seiichiro Morikawa, Kanagawa-ken, Japan

[73] Assignee: Fuji Photo Film Co., Ltd., Kanagawa, Japan

[21] Appl. No.: 77,042

[22] Filed: Jun. 16, 1993

[30] Foreign Application Priority Data

Jun. 19, 1992 [JP] Japan .................... 4-159928

[51] Int. Cl.⁶ .................... H04N 1/40; H04N 1/04
[52] U.S. Cl. .................... 358/488; 358/487; 358/464; 358/449; 358/504; 358/505; 358/506
[58] Field of Search .................... 358/406, 464, 358/465, 467, 474, 487, 488, 504, 505, 506, 538, 449, 453

[56] References Cited

U.S. PATENT DOCUMENTS

| | | |
|---|---|---|
| 4,680,806 | 7/1987 | Bolza-Schünemann ............... 358/488 |
| 4,698,511 | 10/1987 | Sueda et al. ............... 250/560 |
| 4,816,903 | 3/1989 | Utsuda et al. ............... 358/487 |
| 4,893,188 | 1/1990 | Murakami ............... 358/456 |
| 4,910,688 | 3/1990 | Amini ............... 364/551.01 |
| 5,014,124 | 5/1991 | Fujisawa ............... 358/530 |
| 5,150,433 | 9/1992 | Daly ............... 382/56 |
| 5,198,853 | 3/1993 | Ichihara et al. ............... 358/449 |
| 5,204,913 | 4/1993 | Morooka et al. ............... 382/8 |
| 5,243,663 | 9/1993 | Kudoh ............... 382/1 |

*Primary Examiner*—Thomas D. Lee
*Assistant Examiner*—Jerome Grant, II
*Attorney, Agent, or Firm*—Sughrue, Mion, Zinn, Macpeak & Seas, PLLC

[57] ABSTRACT

A readout region with a plurality of zones at grid points is scanned by a transparency or reflection reader to obtain any image data therefrom. Then, a variance of each of three primary colors of the image data is calculated, and compared with a predetermined threshold value to determine whether an original is present in the readout region. When at least one of the variances of the three primaries is greater than the threshold value, then it is determined that an original is present in the readout region.

15 Claims, 7 Drawing Sheets

```
== SETUP START ==
```

ORIGINAL NO. ( 1 )          POSITION OF ORIGINAL

[SIZE/NUMBER OF ORIGINALS] (A6 ; 6)

ORIGINAL TYPE
  [PRINTED MATTER]

START

END

| ◉ | ○ | ○ |
|---|---|---|
| ○ | × | × |

METHOD OF AND APPARATUS FOR DETERMINING WHETHER AN ORIGINAL IS PRESENT IN A READOUT REGION

BACKGROUND OF THE INVENTION

1. Field of the Invention

The present invention relates to a method of and an apparatus for determining whether an original to be read is present in a readout region.

2. Description of the Related Art

Image reading and reproducing systems are in wide use in printing and platemaking industries for electrically processing image information recorded on an original to produce a film negative for the purpose of simplifying the negative producing process and improving the image quality.

Such an image reading and reproducing system has a scanner for photoelectrically scanning a transparency or reflection original to read image information recorded thereon.

One conventional scanner is known as a plane-scanning scanner or flat-bed scanner. To generate a desired film negative from an original with a flat-bed scanner, image information recorded on the original is first roughly read in a pre-scanning mode to establish various image processing conditions including sharpness, tone curve, color correction, trimming, etc. Then, optimum image processing conditions are established based on the image information produced in the pre-scanning mode. Thereafter, the image information recorded on the original is read based on the image processing conditions in a main scanning mode.

In the pre-scanning mode, the flat-bed scanner reads image information from a plurality of originals placed in a given area. After image processing conditions have been established for each of the originals based on the read image information, the originals are scanned in the main scanning mode. If no original is present in a readout region, then it would be useless to establish image processing conditions for that region and scan the region in the main scanning mode. Therefore, the flat-bed scanner is required to determine in advance whether there is an original to be read in the readout region.

In the case where an original to be read is a transparency such as a photographic film or the like, the base density of the original is known and may be used as a threshold value. Consequently, it is possible to determine whether there is an original to be read in the readout region by determining whether an average value of image data in a certain region reaches the base density. If an original to be read is a reflection original, however, it may not be possible to determine whether there is an original to be read in the readout region based on a threshold value because the user of the reader or scanner may apply the reflection original to a base sheet and supply the reflection original on the base sheet to the reader or scanner.

SUMMARY OF THE INVENTION

It is therefore an object of the present invention to provide a method of and an apparatus for determining whether an original to be read is present in a certain readout region regardless of whether the original is a transparency or a reflection original.

According to an aspect of the present invention, there is provided a method of determining whether an original is present in a readout region, comprising the steps of scanning the readout region to obtain image data therefrom, determining a variance of the image data in a plurality of zones established in the readout region, and comparing the variance with a predetermined threshold value to determine whether an original is present in the readout region.

According to another aspect of the present invention, there is also provided an apparatus for determining whether an original is present in a readout region, comprising image reading means for scanning the readout region to obtain image data therefrom, variance calculating means for determining a variance of the image data in a plurality of zones established in the readout region, and control means for comparing the variance with a predetermined threshold value to determine whether an original is present in the readout region.

If the variance of the image data in the zones in the readout region is equal to or smaller than the threshold value, then since the density of the image data is substantially uniform, it is determined that no original is present in the readout region.

Therefore, it can reliably be determined whether there is an original in the readout region, regardless of whether the original is a transparency or a reflection original. Based on the obtained information as to whether there is an original in the readout region, it is possible to prevent a useless process for processing image data produced from a readout region with no original present therein.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
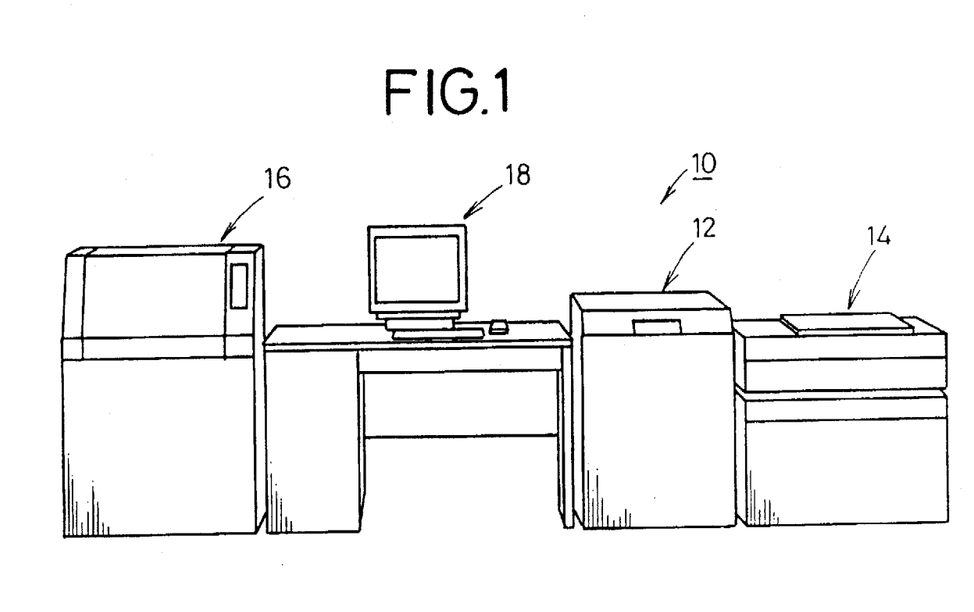
FIG. 1 is a perspective view of an image reading and reproducing system which incorporates the principles of the present invention.

As shown in FIG. 1, the principles of the present invention, i.e., a method of an apparatus for determining whether an original to be read is present in a certain readout region, are incorporated in an image reading and reproducing system 10. The image reading and reproducing system 10 generally comprises a transparency reader 12 for reading image information recorded on a transparency such as a photographic film or the like, a reflection reader 14 for reading image information recorded on a reflection original such as a photographic print or the like, an image output device 16 for reproducing the image information read by the transparency reader 12 or the reflection reader 14 on a photographic film, and a console unit 18 for controlling the transparency reader 12, the reflection reader 14, and the image output device 16.

Figure 2:
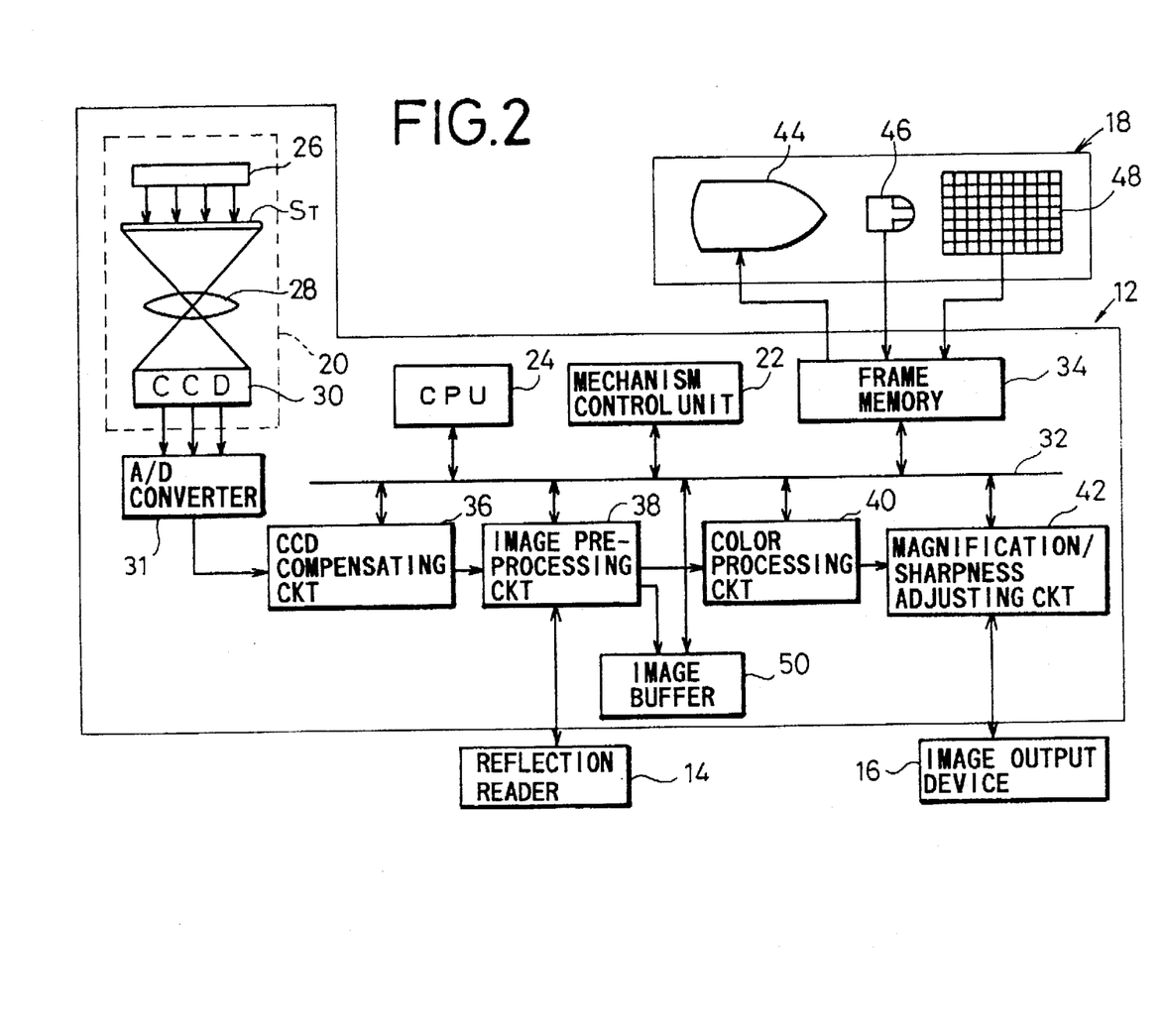
FIG. 2 is a block diagram of a transparency reader in the image reading and reproducing system shown in FIG. 1.

FIG. 2 shows the transparency reader 12 in block form. The transparency reader 12 has a reading unit 20 for reading image information recorded on a transparency $S_T$ such as a photographic film, a mechanism control unit 22 for controlling operation of the mechanical components of the transparency reader 12, and a central processing unit (CPU) 24 for controlling operation of the transparency reader 12 in its entirety. The reading unit 20 comprises a light source 26 for applying illuminating light to the transparency $S_T$ a condensing lens 28 for converging light from the light source 26 that has passed through the transparency $S_T$, and a charge-coupled device (CCD) unit 30 for converting the light that has been applied thereto from the condensing lens 28 into an electric signal. The CCD unit 30 generates an image signal indicative of three primaries R, G, B from the applied light, and outputs the image signal to an analog-to-digital A/D converter 31.

The mechanism control unit 22 and the CPU 24 are connected to a system bus 32. To the system bus 32, there are also connected a frame memory 34, a CCD compensating circuit 36, an image pre-processing circuit 38, a color processing circuit 40, and a magnification/sharpness adjusting circuit 42. The frame memory 34 serves to temporarily store the image information which has been read by the reading unit 20, and supplies the stored image information to a cathode-ray tube (CRT) display unit 44 in the control unit 18, which also has input ports including a mouse 46 and a keyboard 48.

The CCD compensating circuit 36 processes the image data supplied from the A/D converter 31 for CCD darkness correction, shading correction, or the like. The image pre-processing circuit 38 converts output data from the CCD compensating circuit 36 into density values in the reader or scanner, and effects switching between input image data from transparencies and reflection originals. An image buffer 50, which is connected to an output terminal of the image pre-processing circuit 38, serves to store pre-scanned image data. The CPU 24 determines a variance from the image data stored in the image buffer 50 to determine whether there is an original in a readout region. The color processing circuit 40 effects desired color processing on image data based on image processing conditions. The magnification/sharpness adjusting circuit 42 serves to magnify the image data and effects sharpness adjustment on the image data.

Figure 3:
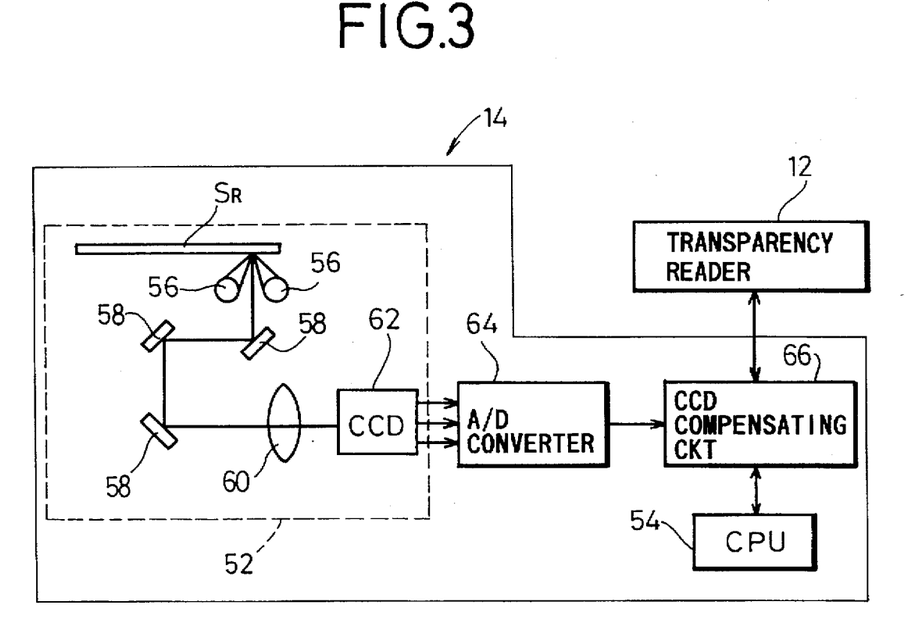
FIG. 3 is a block diagram of a reflection reader in the image reading and reproducing system shown in FIG. 1.

FIG. 3 shows the reflection reader 14 in block form. The reflection reader 14 has a reading unit 52 for reading image information recorded on a reflection original $S_R$ such as a photographic print, and a CPU 54 for controlling the reflection reader 14 in its entirety. The reading unit 52 comprises a light source 56 for applying illuminating light to the reflection original $S_R$, a plurality of reflecting mirrors 58 for guiding light from the light source 56 that has been reflected by the reflection original $S_R$, a condensing lens 60 for converging the reflected light, and a CCD unit 62 for converting the light that has been applied thereto from the condensing lens 60 into an electric signal. The CCD unit 62 generates an image signal indicative of three primaries R, G, B from the applied light, and outputs the image signal to an analog-to-digital A/D converter 64.

To the CPU 54, there is connected a CCD compensating circuit 66 that processes the image data supplied from the A/D converter 64 for CCD darkness correction, shading correction, or the like, and outputs the processed image data to the image pre-processing circuit 48 of the transparency reader 12. Therefore, the image data read by the reflection reader 14 is processed in the transparency reader 12 shown in FIG. 2.

Figure 4:
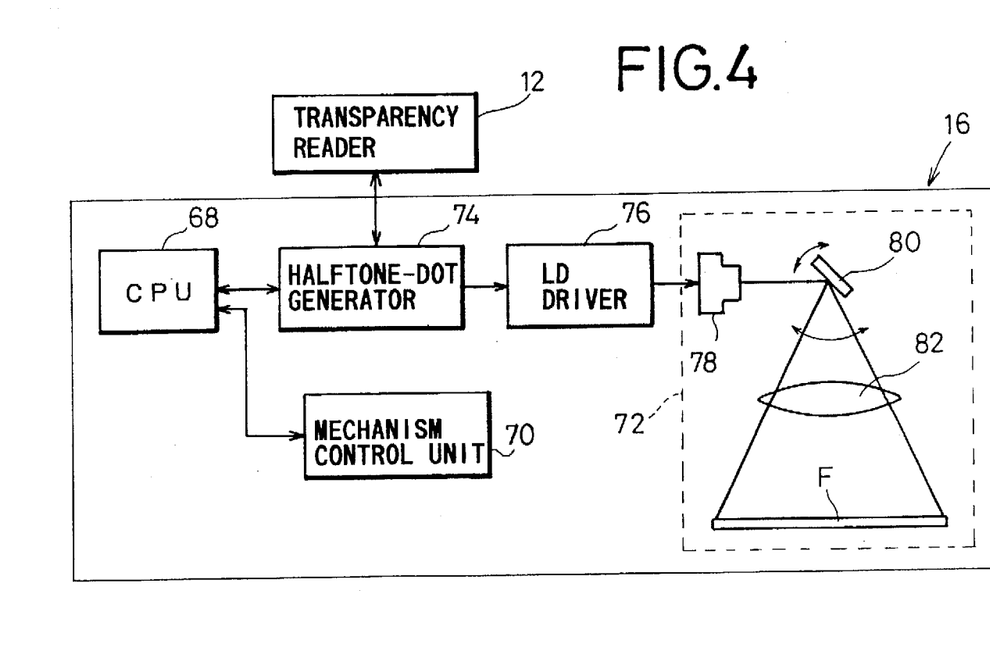
FIG. 4 is a block diagram of an image output device in the image reading and reproducing system shown in FIG. 1.

FIG. 4 shows the image output device 16 in block form. The image output device 16 comprises a CPU 68 for controlling operation of the entire image output device 16, a mechanism control unit 70 for controlling operation of the mechanical components of the image output device 16, and a recording unit 72 for recording image information on a photosensitive film F. To the CPU 68, there is connected a halftone-dot generator 74 which generates a halftone-dot signal from the image data supplied from the magnification/sharpness adjusting circuit 42 in the transparency reader 12. The generated halftone-dot signal is supplied to an laser diode (LD) driver 76. In response to the supplied halftone-dot signal, the LD driver 76 drives a laser diode 78 in the recording unit 72. The recording unit 72 also contains a light deflector 80 for deflecting a laser beam L emitted by the laser diode 78 in a main scanning direction, and a condensing lens 82 for converging the deflected laser beam L onto the photosensitive film F.

Operation of the image reading and reproducing system 10 for determining whether there is an original in a readout region will be described below.

Figure 5:
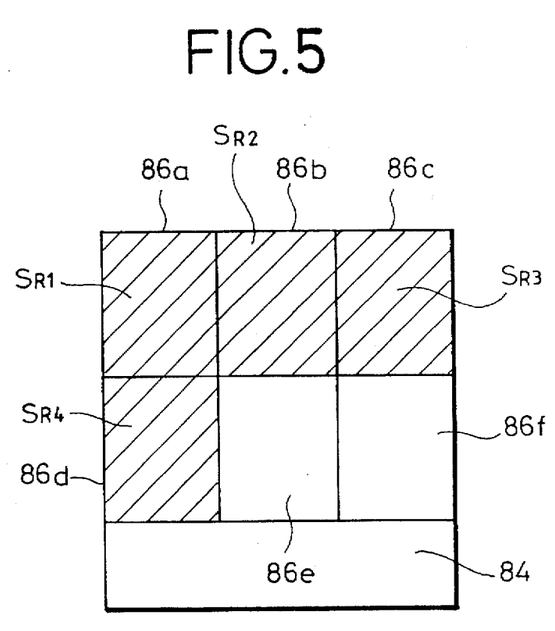
FIG. 5 is a view of reflection originals applied to a readout region on a base sheet.

Originals to be read which are of various sizes may be placed in each of the transparency reader 12 and the reflection reader 14. FIG. 5 shows, by way of example, a pattern of originals placed in the reflection reader 14. As shown in FIG. 5, a base sheet 84 which is to be placed in the reflection reader 14 has six readout regions 86a through 86f established based on an indicated original size. Originals to be read are applied to desired ones of these readout regions 86a through 86f. In the illustrated example, reflection originals $S_{R1}$ through $S_{R4}$ are applied to the readout regions 86a through 86d, respectively, and no reflection originals are applied to the remaining readout regions 86e, 86f.

The user of the image reading and reproducing system 10 places the base sheet 84 with the reflection originals $S_{R1}$ through $S_{R4}$ applied thereto in the reading unit 52, and indicates the size of the originals to be read. Based on the indicated size of the originals, the reflection reader 14 recognizes the readout regions 86a through 86f. Thereafter, the user causes the reflection reader 14 to read the reflection originals $S_{R1}$ through $S_{R4}$ in a pre-scanning mode.

Light emitted from the light source 56 is applied to the reflection originals $S_{R1}$ through $S_{R4}$, and light reflected by the reflection originals $S_{R1}$ through $S_{R4}$ and bearing image information thereof is reflected by the reflecting mirrors 58 and converged by the condensing lens 60 onto the CCD unit 62. The CCD unit 62 converts the applied light into an RGB image signal and applies the image signal to the A/D converter 64. The A/D converter 64 converts the image signal into digital image data, and supplies the digital image data to the CCD compensating circuit 66. The CCD compensating circuit 66 effects CCD darkness correction and shading correction on the digital image data under the control of the CPU 54, and stores the corrected digital image data into the image buffer 50 through the image pre-processing circuit 3B in the transparency reader 12 shown in FIG. 2. The transparency reader 12 now determines whether there is an original in the readout regions 86a through 86f on the base sheet 84, based on the image data stored in the image buffer 50.

Figure 6:
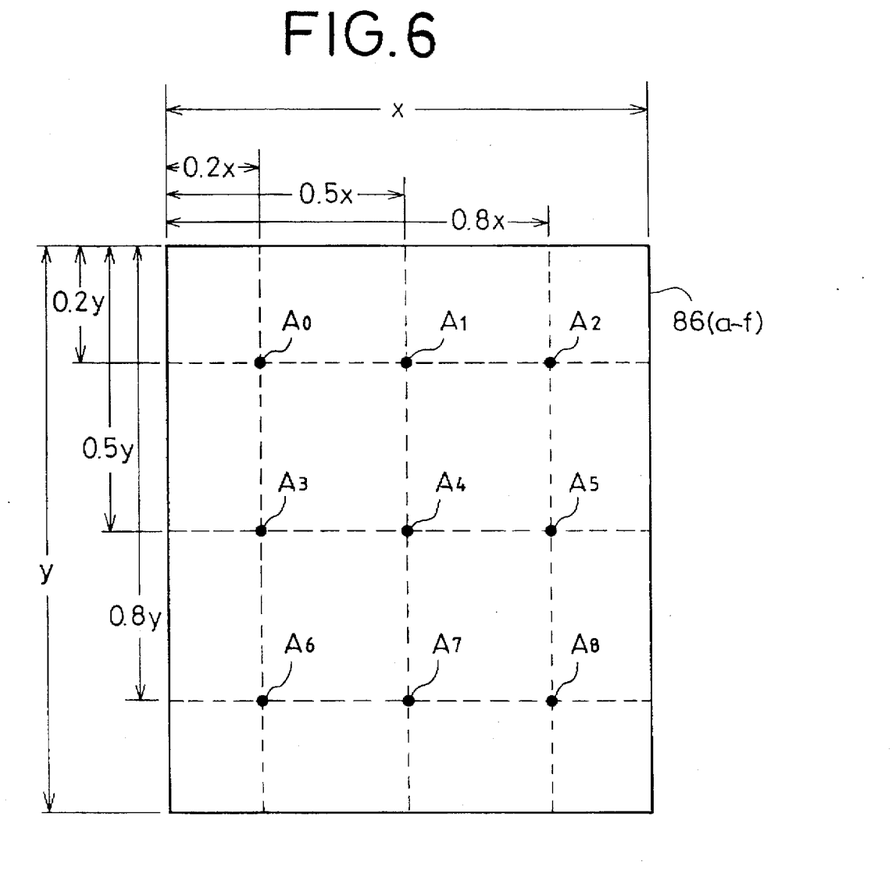
FIG. 6 is a view of a zone in the readout region.

More specifically, as shown in FIG. 6, the image buffer 50 has nine zones $A_0$ through $A_8$ established at respective grid points in its memory space in x, y coordinates with respect to each of the readout regions 86a through 86f. Each of the zones $A_0$ through $A_8$ is composed of 5×5 dots. The CPU 24 determines an average $u_{ij}$ ($i$=0~8, $j$=Y, M, C) of image data of each of the colors Y, M, C contained in the zones $A_0$ through $A_8$ in the image data in each of the readout regions 86a through 86f, to remove errors which would otherwise be induced by dust and noise.

Then, the CPU 24 determines the variances $V_j$; of the average $u_{ij}$ of image data of each of the colors Y, M, C contained in the zones $A_0$ through $A_8$ according to the following equation:

$$V_j = \frac{1}{9} \sum_{i=0}^{8} (u_{ij} - \bar{u}_j)^2 \quad (1)$$

$$(j = Y, M, C)$$

($\bar{u}_j$ is the average of $u_{ij}$).

If Max ($V_Y$, $V_M$, $V_C$), the maximum of the variances $V_j$ determined by the equation (1) above, satisfies the following relationship with respect to a predetermined threshold value $T_H$:

$$\text{Max } (V_Y, V_M, V_C) \leq T_H \quad (2),$$

then the CPU 24 determines that no original is present in the readout regions 86a through 86f. The reason for this is that if any of the variances $V_j$ is equal to or lower than the threshold value $T_H$, then the image data density in the readout regions 86a through 86f can be regarded as being substantially uniform, and no original can be regarded as existing in the readout regions 86a through 86f. If any of the variances $V_j$ is greater than $T_H$, then an original is considered to be present.

If smaller zones are established on straight lines interconnecting the zones $A_0$, $A_8$ and the zones $A_2$, $A_6$, then it is possible to determine more reliably whether an original is present in the readout regions, even though the image area of the original is smaller.

Figure 7:
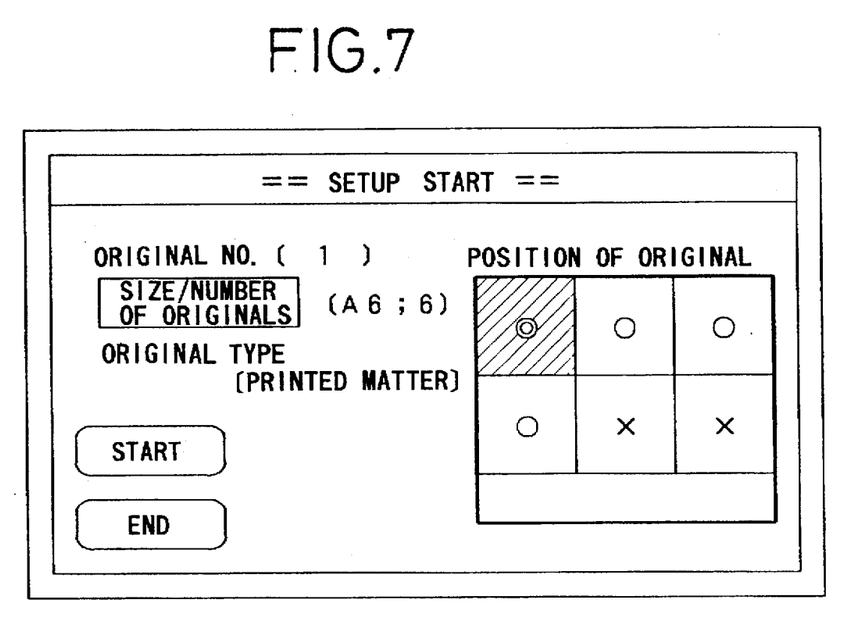
FIG. 7 is a view of a display area for displaying information as to whether the originals shown in FIG. 5 are present in the readout region.

The information produced by the CPU 24, indicative of whether an original is present in the readout regions, is transmitted to the console unit 18. The CRT display unit 44 then displays the supplied information as shown in FIG. 7. The mark ⊚ (displayed in reverse) and the mark ○ indicate that the reflection originals $SR_1$ through $SR_4$ are present in the readout regions 86a through 86d, respectively, and the mark X indicates that no original is present in the readout regions 86e, 86f. The mark ⊚ indicates that the depression of a start button can open a display screen (not shown) for setting image processing conditions (setup conditions), described below, for the reflection original $S_{R1}$ applied to the readout region 86a.

Then, the user operates on the keyboard 48 to set image processing conditions for the reflection originals $SR_1$ through $SR_4$. The image processing conditions are processing conditions for producing film negatives from the image information recorded on the reflection originals $SR_1$ through $SR_4$, and represent sharpness, tone curve, color correction, trimming, etc. Since the CRT display unit 44 displays the information as to whether an original is present in the readout regions 86a through 86f, the user can avoid any useless process to establish image processing conditions for the readout regions 86a, 86e where no original is present.

After the image processing conditions have been established with respect to the reflection originals $SR_1$ through $SR_4$, the reflection reader 14 reads the image information on the reflection originals $SR_1$ through $SR_4$ in a main scanning mode. The image information read by the reflection reader 14 in the main scanning mode is transferred to the image pre-processing circuit 38. Based on the image processing conditions, desired image processing is effected on the image information by the color processing circuit 40 and the magnification/sharpness adjusting circuit 42. Thereafter, the processed image information is supplied to the image output device 16.

In the image output device 16, the halftone-dot generator 74 generates a halftone-dot signal with respect to the image information supplied from the transparency reader 12, and the generated halftone-dot signal is supplied to the LD driver 76. The LD driver 76 drives the laser diode 78 to emit a laser beam L according to the halftone-dot signal. The emitted laser beam L is deflected by the light deflector 80, and applied through the condensing lens 82 to the photosensitive film F for thereby forming a desired image thereon.

In the above embodiment, reflection image information is read by the reflection reader 14 to determine whether there is an original to be read in the readout regions. However, transparency image information may be read by the transparency reader 12 to determine whether there is an original to be read in the readout regions. When transparency image information is read, it is possible to determine whether there is an original to be read in the readout regions based on the base density of a transparency, as with the conventional process. However, when transparency image information is read, it is also possible to determine whether there is an original to be read in the readout regions based on a variance $V_j$ of image data in the zones $A_0$ through $A_8$ as shown in FIG. 6, in accordance with the method described above for reflection image information.

Although a certain preferred embodiment of the present invention has been shown and described in detail, it should be understood that various changes and modifications may be made therein without departing from the scope of the appended claims.

What is claimed is:

1. A method of determining whether an original is present in a readout region, comprising the steps of:
    (a) defining a plurality of zones in said readout region, each of the plurality of zones includes a plurality of dots;
    (b) scanning the readout region to obtain image data therefrom;
    (c) determining a variance of said image data in said plurality of zones; and
    (d) comparing said variance with a predetermined threshold value to determine whether an original is present in said readout region.

2. A method according to claim 1, wherein the plurality of dots comprises a matrix of dots.

3. A method according to claim 2, wherein the matrix of dots is 5×5.

4. A method of determining whether an original is Present in a readout region, comprising the steps of:
    (a) defining a plurality of zones in said readout region;
    (b) scanning the readout region to obtain image data therefrom;
    (c) determining a variance of said image data in said plurality of zones; and
    (d) comparing said variance with a predetermined threshold value to determine whether an original is Present in said readout region, wherein said step (c) comprises the step of determining the variance of each of three primary colors of said image data, and said step (d)

comprises the step of determining that an original is present in the readout region if at least one of the variances of the three primary colors is greater than said threshold value.

5. A method according to claim 4, wherein said step (c) comprises the step of averaging respective image data in said zones for the purpose of calculating said variances.

6. A method of determining whether an original is present in a readout region, comprising the steps of:

(a) defining a plurality of zones in said readout region;
   (b) scanning the readout region to obtain image data therefrom;
   (c) determining a variance of said image data in said plurality of zones; and
   (d) comparing said variance with a predetermined threshold value to determine whether an original is present in said readout region, wherein said step (c) comprises the step of averaging respective image data in said zones for the purpose of calculating said variances.

7. A method according to claims 1, 4, 6 or 5, wherein said zones are positioned at respective grid points regularly spaced in said readout region.

8. A method according to claims 1, 4, 6 or 5, wherein said original comprises a reflection original.

9. A method according to claims 1, 4, 6 or 5, wherein said original comprises a transparency.

10. An apparatus for determining whether an original is present in a readout region, comprising:

image reading means for scanning the readout region to obtain image data therefrom;
    variance calculating means for determining a variance of the image data in a plurality of zones established in said readout region, each of the plurality of zones including a plurality of dots; and
    control means for comparing said variance with a predetermined threshold value to determine whether an original is present in said readout region.

11. An apparatus according to claim 10, further comprising display means for displaying information as to whether an original is present in said readout region as determined by said control means.

12. An apparatus according to claim 10, wherein the plurality of dots comprises a matrix of dots.

13. An apparatus according to claim 12, wherein the matrix of dots is 5×5.

14. An apparatus for determining whether an original is present in a readout region, comprising:

image reading means for scanning the readout region to obtain image data therefrom;
    variance calculating means for determining a variance of the image data in a plurality of zones established in said readout region; and
    control means for comparing said variance with a predetermined threshold value to determine whether an original is present in said readout region, wherein the variance calculating means further comprises a means for determining the variance of each of three primary colors of the image data and wherein the control means further comprises a means for determining that an original is present in the readout region if at least one of the variances of the three primary colors is greater than the threshold value.

15. An apparatus for determining whether an original is present in a readout region, comprising:

image reading means for scanning the readout region to obtain image data therefrom;
    variance calculating means for determining a variance of the image data in a plurality of zones established in said readout region; and
    control means for comparing said variance with a predetermined threshold value to determine whether an original is present in said readout region, wherein the variance calculating means further comprises a means for averaging respective image data in the zones for the purpose of calculating the variances.

* * * * *